(12) United States Patent
Drechsel et al.

(10) Patent No.: US 11,440,140 B2
(45) Date of Patent: Sep. 13, 2022

(54) METHOD FOR INTRODUCING A DEFINED WEAKENING LINE BY MEANS OF A PULSED LASER BEAM VIA MATERIAL REMOVAL ON A COVER MATERIAL

(71) Applicant: EISSMANN AUTOMOTIVE DEUTSCHLAND GMBH, Bad Urach (DE)

(72) Inventors: Jan Drechsel, Dresden (DE); Robby Ebert, Chemnitz (DE)

(*) Notice: Subject to any disclaimer, the term of this patent is extended or adjusted under 35 U.S.C. 154(b) by 454 days.

(21) Appl. No.: 16/603,666

(22) PCT Filed: Mar. 19, 2018

(86) PCT No.: PCT/EP2018/056813
§ 371 (c)(1),
(2) Date: Oct. 8, 2019

(87) PCT Pub. No.: WO2018/188899
PCT Pub. Date: Oct. 18, 2018

(65) Prior Publication Data
US 2020/0114471 A1 Apr. 16, 2020

(30) Foreign Application Priority Data
Apr. 12, 2017 (DE) .................... 10 2017 107 935.1

(51) Int. Cl.
*B23K 26/364* (2014.01)
*B23K 26/082* (2014.01)
(Continued)

(52) U.S. Cl.
CPC .......... *B23K 26/364* (2015.10); *B23K 26/032* (2013.01); *B23K 26/082* (2015.10);
(Continued)

(58) Field of Classification Search
CPC ........................... B23K 26/382; B23K 26/705
See application file for complete search history.

(56) References Cited

U.S. PATENT DOCUMENTS 4,789,770 A * 12/1988 Kasner ............... B23K 26/0613
219/121.75
5,126,532 A * 6/1992 Inagawa ................ B23K 26/40
219/121.75
(Continued)

FOREIGN PATENT DOCUMENTS

DE 19636429 11/1997
DE 19850299 A1 * 5/2000 ............. B23K 26/08
(Continued)

*Primary Examiner* — Timothy Kennedy
(74) *Attorney, Agent, or Firm* — Mark Wisnosky

(57) ABSTRACT

The invention relates to a method for introducing a defined weakening line by means of material removal on a cover material (20) which has a visible side (22) and a rear side (21) opposite the visible side (22), in which a pulsed laser beam (31) from a laser (30) is aimed at the rear side (21) of the cover material (20) and is guided along a path (50) and at least one observation unit (11) for monitoring the weakening process is provided underneath the visible side (22) of the cover material (20), wherein a second laser beam (61) from a second laser (60) is coupled into the beam path of the first laser beam (31), wherein the first pulsed laser beam (31) is used to produce the weakening line, and the radiation from the second laser beam (61) that emerges on the visible side (22) is detected by the at least one observation unit (11).

20 Claims, 2 Drawing Sheets

Figure 1:
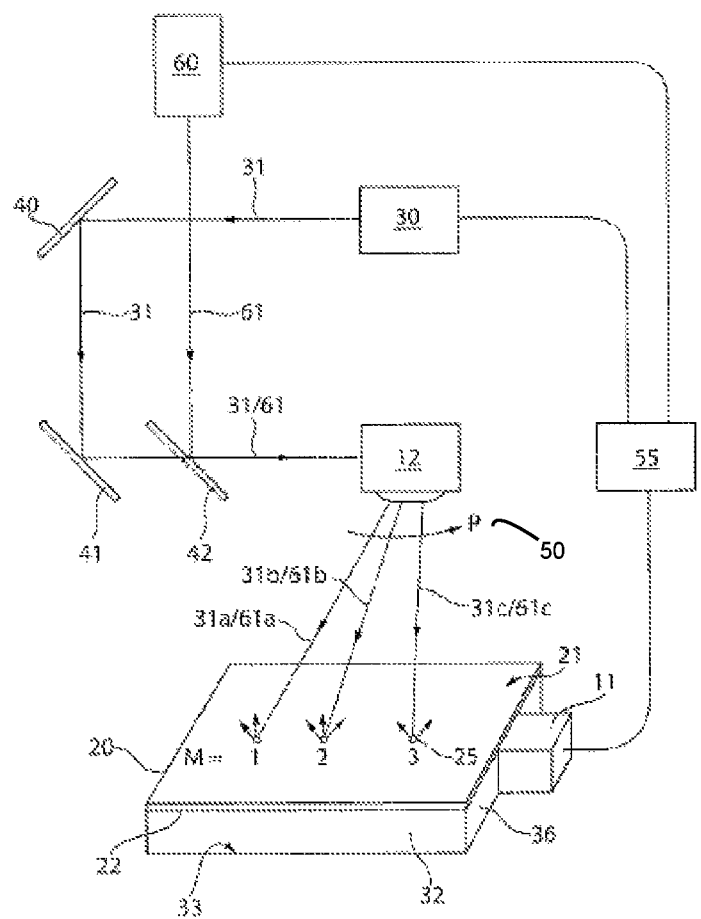

(51) Int. Cl.
    *B23K 26/70* (2014.01)
    *B23K 26/03* (2006.01)
    *C14B 1/44* (2006.01)
    *B23K 103/00* (2006.01)
    *B60R 21/2165* (2011.01)

(52) U.S. Cl.
    CPC .............. *B23K 26/705* (2015.10); *C14B 1/44*
        (2013.01); *B23K 2103/34* (2018.08); *B23K*
        *2103/38* (2018.08); *B60R 21/2165* (2013.01)

(56) References Cited

U.S. PATENT DOCUMENTS

| | | | | |
|---|---|---|---|---|
| 6,337,461 | B1* | 1/2002 | Yasuda | B23K 26/032 |
| | | | | 219/121.62 |
| 6,713,718 | B1* | 3/2004 | Lu | B23K 26/389 |
| | | | | 219/121.69 |
| 7,284,975 | B2* | 10/2007 | Morita | B26D 3/085 |
| | | | | 83/881 |
| 8,525,073 | B2* | 9/2013 | Quitter | B23K 26/046 |
| | | | | 219/121.75 |
| 8,735,768 | B2* | 5/2014 | Urashima | B23K 26/26 |
| | | | | 219/121.75 |
| 2001/0006168 | A1 | 7/2001 | Okumura et al. | |
| 2001/0037998 | A1* | 11/2001 | Nicholas | B23K 26/389 |
| | | | | 219/121.69 |
| 2002/0153500 | A1* | 10/2002 | Fordahl | B23K 26/382 |
| | | | | 250/559.29 |
| 2003/0019848 | A1 | 1/2003 | Nicholas et al. | |
| 2006/0226638 | A1* | 10/2006 | Yasuda | B32B 5/18 |
| | | | | 428/43 |
| 2006/0237406 | A1* | 10/2006 | Schmidt-Sandte | B23K 26/032 |
| | | | | 219/121.7 |
| 2008/0203708 | A1* | 8/2008 | Okumura | B23K 26/08 |
| | | | | 264/400 |
| 2008/0290075 | A1* | 11/2008 | Wittenbecher | B23K 26/389 |
| | | | | 425/141 |
| 2012/0104237 | A1 | 5/2012 | Rossbach | |
| 2018/0133841 | A1* | 5/2018 | Lutze | B23K 26/0626 |

FOREIGN PATENT DOCUMENTS

| | | | |
|---|---|---|---|
| DE | 10305875 | 9/2004 | |
| DE | 202009004927 | 10/2010 | |
| DE | 102005040017 | 3/2014 | |
| DE | 102013104138 | 3/2014 | |
| EP | 1750978 | 2/2007 | |
| EP | 2093011 | 8/2009 | |
| EP | 2962800 | 1/2016 | |
| EP | 3 120 966 | 1/2017 | |
| FR | 2112586 A5 * | 6/1972 | ........... B23K 26/032 |
| WO | WO 2004/071704 | 8/2004 | |
| WO | WO2005049261 | 6/2006 | |

* cited by examiner

METHOD FOR INTRODUCING A DEFINED WEAKENING LINE BY MEANS OF A PULSED LASER BEAM VIA MATERIAL REMOVAL ON A COVER MATERIAL

The present invention relates to a method for introducing a defined weakness line using a pulsed laser beam by material removal on a covering material. Covering materials having introduced weaknesses are used in the automotive field, for example for producing coverings for airbags.

Nowadays, airbags in motor vehicles are integrated at different locations, for example in steering wheels, dashboards, doors, seats, roof coverings etc. For the airbag to function reliably, it is necessary for the plastic carrier to have one or more material weaknesses, so-called predetermined breaking points, in all its layers, said material weaknesses defining the deployment channel of the airbag.

For visual reasons or because of the design, motor vehicle manufacturers require the passenger airbag, for example, which is integrated in the dashboard, to be formed invisibly on the side facing towards the occupant. To do so, the dashboard having the airbag shutter integrated therein is provided with a covering material, which, in the region of the edging of the airbag shutter, has a weakness line, such that the safe opening of the airbag shutter and the unfolding of the airbag is still ensured in the event of a collision.

Opening the covering material along the weakness line must additionally take place within a predetermined window of time. Similarly, an uncontrolled particle flight as a result of fragments flying around must be avoided at all costs.

Such covering materials for airbags are known to be made of different materials, for example made of plastic films, covering fabric, textiles, slush moulding, artificial leather or fibrous materials such as natural leather. Just as with upscale vehicle furnishing, the coverings are often produced from natural leather. The leather used in the automotive field consists of an epidermis and a dermis. Because of the thickness deviations of the leather and the relatively low thickness of the epidermis, when generating weaknesses in the leather by cutting into the rear side of the leather with a knife of a blade, an incision depth is usually chosen at which the epidermis remains intact. Nevertheless, the natural deviating widths of the intact epidermis lead to a strong deviating width of the tear strength.

Just as with predetermined break lines for airbag coverings, the requirements of a reproducible and low tear strength are particularly high, which cannot always be met with a mechanical incision.

It has already been suggested to introduce linear perforations of a length of less than 0.8 mm spaced apart from one another into the leather, as is described in EP 1 750 978 B1. Because of the minimal size of the perforations introduced, which are the size of the leather pores, a leather weakened in this manner has substantially invisible weaknesses with good tearing properties, wherein the weaknesses are introduced using a blade, in particular.

In addition, it is known to perforate weakness lines, in particular in airbag covering materials, or in decorative layers for airbag covers by means of lasers. Micro-holes are introduced into the material for the targeted weakening of leather by means of UV laser radiation. These are generally arranged along one track and thus form a defined weakness line. The irradiation takes place on the rear side, the so-called meat side of the leather, such that the front or upper side of the leather is only minimally damaged by the laser radiation.

The micro-holes are generally generated by irradiation several times with individual laser pulses. Since the leather is a very inhomogeneous material, the number of laser pulses, which are required to completely penetrate the leather, varies considerably; the variations are about ±50% of the average.

However, for a defined and safe perforation, the complete or virtually complete penetration of the leather is inevitable.

However, if the leather is further irradiated at the location of a micro-hole, although a complete penetration has already taken place, then an unwanted local colouring and hardening of the leather sets in very quickly.

In order to avoid changes to the fibre structure of the leather, which lead to curling up and thus to visibility of the weakness lines, it has been suggested, for example, to either supercool or preshrink the leather before the laser processing or to treat it with special fixing means on the rear side, as is described in WO 2005/049261.

DE 196 36 429 C1 describes a method for generating a weakness line in a covering material by locally removing the covering material on one side in the form of bag holes by means of controllable pulsed laser radiation, wherein a relative movement takes place between the laser radiation and the covering material in the direction of the weakness line to be generated, and the laser radiation transmitted by the base of the respective bag hole is detected after every laser pulse by means of a sensor, the integral value is formed and compared to a nominal value, and the laser radiation is switched off on reaching the nominal value and is switched on again after the relative movement has taken place with the next bag hole still to be weakened.

Such a determination of the remaining wall thickness by means of a transmission measurement nevertheless makes it necessary for the sensor or the photodiode to follow the position of the laser beam. In order to be able to measure the laser pulse at every point of incidence and to switch off the laser where necessary, the photodiode is also moved correspondingly to the movement of the laser beam on the visible side of the covering material. However, this method cannot be implemented when using highly repetitive lasers, since the photodiode cannot be moved with the necessary speed with the required accuracy.

DE 103 05 875 A1 teaches a method for the process reliability of a drilling process, wherein a laser beam supplies a region of a workpiece and a measuring beam is directed onto the bore found in the emergence inside this region.

A method for introducing a defined weakness line is known from EP 2 962 800 A2, in which a pulsed laser beam from a laser is directed onto the rear side of a covering material and is guided along a track. An observation unit is arranged below the visible side of the covering material.

DE 10 2013 104 138 B3 teaches a method in which the optical and haptic change of the leather weakened by means of a laser beam is to be prevented by the laser beam being linearly guided on the rear side of the leather and the linear guiding being a multiple repetition of a scanning movement, in which only one laser pulse is emitted respectively per point of incidence along the line. Here, the parameters of the laser impulse are chosen in such a way that it causes an energy input, which leads to a heating of the covering material to a temperature above an ablation threshold, although the temperature in regions of the covering material abutting on the respective points of incidence lies below a boundary temperature.

The control of the remaining wall thickness also takes place using a photodiode, which is arranged opposite the short pulse laser in the direction of the laser beam on the visible side of the fibrous covering material. The photodiode continuously measures the thickness of a portion of the pulses transmitting through the fibrous covering material, such that the laser beam can still be switched off on reaching the desired minimum remaining wall thickness before the complete penetration of the fibrous covering material. If the minimum remaining wall thickness is already obtained at a point of incidence, a local switching off of the laser beam takes place with the next scanning movement at this point of incidence.

So that the scanning movement is no longer necessary, a plurality of photodiodes lined up one behind the other is provided along the scanning track. In this method, the sensor must be spatially high-resolution (at least in the region of the hole spacing of the perforation line), and it must be the size of the perforation section to be prepared.

However, the use of infra-red short pulse lasers is disadvantageous because of the thermal edge load along the point of incidence of the laser beam. In addition, the result obtained with the laser process is dependent on the state of the covering material, for example the dampness present in the leather.

The covering materials can be process substantially more gently and in a more defined manner with UV laser radiation, as described in DE 10 2008 053 213 B4. However, UV laser radiation is greatly absorbed by the materials. Thus, the covering material must be completely drilled through by the laser for the UV radiation to be able to be detected at all using the observation unit, which is provided below the visible side of the covering material.

The object of the present invention is to improve the method for introducing weakness lines by means of a pulsed laser beam by material removal on a covering material, in particular leather, to the effect that sufficiently weakened covering materials are obtained with weakness lines that are substantially invisible.

This object is solved in a method for introducing a defined weakness line by material removal on a covering material, which has a visible side and a rear side opposite the visible side, in which a pulsed laser beam from a laser is directed onto a rear side of the covering material and is guided along a track, and at least one observation unit for monitoring at least one observation unit is provided below the visible side of the covering material, in that a second laser beam from a second laser is coupled into the beam path of the first laser beam, wherein the first pulsed laser beam serves to generate the weakness line, and wherein the beam of the second laser beam hitting the visible side is detected by the at least one observation unit.

It is essential that the two laser beams are used together or simultaneously or substantially simultaneously. The material can be processed gently and quickly with the first laser beam, which is preferably a UV laser beam, since this radiation is absorbed very well. The second laser beam is longer-wave and thus also lacking in energy in comparison the first laser beam and preferably a visible or near infra-red laser beam (NIR laser beam).

NIR laser radiation can irradiate through the material. Therefore, the wavelength for the laser processing is not as well suited. Depending on the thickness of the remaining wall, the intensity of the radiation hitting the visible side of the covering material changes, such that the intensity of this wavelength is very well suited to measuring the thickness of the remaining wall. Since the NIR laser radiation is not used simultaneously to the processing of the covering material, the measuring of the radiation of the second laser transmitted through the covering material is very accurate.

The covering material can be both processed gently (UV laser radiation) and the thickness of the remaining wall can be measured accurately (NIR laser radiation).

The energy of the first pulsed laser beam removes material with each pulse on the point of incidence on the rear side of the covering material, for example in the case of leather on the flesh side. The covering material is increasingly weakened at the point of incidence of the laser beams by the material removal, such that the layer thickness of the covering material on the point of incidence is reduced with each pulse. As soon as a remaining wall is sufficiently thin, a measurable portion of the laser radiation of the second laser penetrates the remaining wall and directly or indirectly hits the at least one observation unit, which measures the intensity of the emerging laser light.

Depending on the desired final remaining wall thickness, the method can be stopped or continued until the desired final remaining wall thickness is obtained.

The thickness of the remaining wall to be obtained depends on the desired tensile strength and generally lies between 1 micrometre and 200 micrometre and preferably between 10 micrometre and 30 micrometre.

The second laser beam can be pulsed on non-pulsed. It is coupled into the first laser beam, i.e. the beam path of the first laser beam and the second laser beam is identical or virtually identical, such that the first and the second laser beam hit the same point of incidence on the rear side of the covering material and penetrate into the same hole.

Exceeding a certain threshold value of the intensity of the detected beam of the second laser shows that the remaining wall is sufficiently weakened in the hole, such that, with the next scanning movement, a local switching off of the first laser beam takes place at this point of incidence. Similarly, the second laser can also be switched off locally at this point of incidence.

The intensity of the second laser with continuous radiation or the energy of the second laser with pulsed radiation is extensively lower than that of the first laser, since the second laser does not serve for drilling holes but only for detection. Here, the intensity or the energy of the second laser is chosen to be so high that, on one hand, a measuring signal can be obtained, and so low that, on the other hand, there is no damage to the covering material.

In doing so, material changes as a result of an energy density of the second laser that is too high and any embrittling are also avoided.

According to the invention, beam path of the first laser is to be understood as the course of the route crossed by the first laser beam. Thus, the second laser beam can also be coupled into the beam path of the first laser beam when the first laser is switched off or the pulses of the first and second lasers are temporally offset in relation to each other.

According to the invention, the holes in the covering material are bag holes.

In a preferred variant, the first pulsed laser beam from the laser firstly falls across a mirror and a scanning device onto the rear side of the covering material, wherein the laser pulse is guided along the track by the scanning device. The scanning device serves to move the laser beam on the rear side of the leather along in the desired track.

Advantageously, the second laser beam is coupled into the beam path of the first laser beam via a semi-transparent mirror. The semi-transparent mirror is transparent for the first laser beam, but not for the second laser beam, such that the second laser beam can be reflected into the first laser beam. Similarly, the semi-transparent mirror can be transparent for the second laser beam and not transparent for the first laser beam, such that the first laser beam is reflected into the beam path of the second laser. Preferably, the two laser beams are coupled to each other before they reach the scanning device.

In general, scanning devices comprise a scanning head having a drive or control electronic system. In the scanning head, the leaser beam or the coupled laser beam is deflected, its angle of deflection is measured and (often) electronically regulated. In general, the deflection speed, the working distance in relation to the covering material, the processing geometry and the number of crossings (repetitions of the processing cycle) should be able to be changed by the scanning device to be used. The simplest method of generating a scanning movement is changing the orientation of a mirror.

The observation unit serves to monitor the laser processes, i.e. the drilling of the bag holes. The observation unit can be a camera or photodiode system, for example. It is also possible to provide one or more photodiodes. The observation unit is preferably arranged below the visible side of the covering material. The size of the observation unit can be, for example, 50 mm×35 mm×15 mm. The observation unit is preferably a silicon photodiode having a sensitivity between 200 nm and 1100 nm. The light-sensitive surface can be 13 mm$^2$, for example, and have a sensitivity of 0.3 A/W.

So that a plurality of observation units does not have to be used or the observation unit does not have to be updated, so that the intensity of the radiation can be measured under the point of incidence of the second laser beam, a hollow chamber is preferably provided below the visible side of the covering material, said hollow chamber having a scattering and/or reflecting inner surface.

The at least one observation unit can thus be provided on the hollow chamber, laterally for example.

The method according to the invention can also be used with highly dynamic laser processes, since the hollow chamber is stationary and does not have to moved correspondingly to the movement of the laser beam, as is known in the sensors known from the prior art. In order to be able to monitor the material erosion across all the holes arranged along a track, the hollow chamber should extend at least along the entire track to be processed with the laser on the visible side.

The hollow chamber is preferably substantially rectangular, wherein the covering material, in particular leather, abuts on the outer surface of the hollow chamber pointing upwards with its visible side. There is a slot in the side of the chamber pointing upwards. The movement of the laser takes place along the slot, such that the laser light of the second laser beam transmitted by the covering material can enter the inner space of the hollow chamber.

The inner surface of the hollow chamber should have a high reflection capability for the radiation of the second laser and absorb as little as possible in order to still scatter/reflect enough light onto the photodiode with each hole maximally removed from the photodiode as well.

This preferred variant is characterised by a high signal strength.

The radiation intensity of the second laser detected by the observation unit, in particular photodiodes, is used as the trigger for aborting the process. The allocation of the measuring signal to the point of incidence is realised via the synchronisation of the laser beam source, scanning device, observation unit and the laser pulse control system or laser pulse switching device, such that the point at which the laser radiation hits the inner surface of the hollow chamber is irrelevant.

Paper that has a high reflection capability can be used as a cost-effective inner surface coating of the hollow chamber.

In order to obtain a particularly high degree of reflection and low absorption, the use of a barium sulphate coating of the inner surface or the use of optical PTFE is preferred.

An advantage of the method according to the invention is that the method can also be reliably used with light or luminescent materials, in particular leathers, since the observation unit detects radiation of a different wavelength, such that luminescence or other secondary radiation is not also measured and the measuring adulterated.

The photodiode(s) are stationary and are preferably found on the side of the hollow chamber and detect scattered laser radiation of the second laser independent of the point of incidence of the laser radiation in the chamber.

As soon as the observation unit detects an exceeding of the threshold value of the radiation of the second laser beam measured in the observation unit, the first laser is switched off at this point. This takes place using a pulse switching-off device. The pulse switching-off device should be very quick, i.e. be able to monitor 50,000 holes per second, be able to process very short pulses with half-value width of c. 35 nanoseconds and also be suitable for processing signals with a very low level of 10 mV to 20 mV.

The switching threshold can be determined by means of a settable reference level.

In addition, the pulse switching-off device should be able to store at least 10,000 values (corresponding to 0.6 m with a hole spacing of 60 micrometres).

Moreover, there is an outstanding possibility to ensure quality of the leather processing and proof of the successful processing as a result of the option for storing the sensor data.

Exceeding a certain threshold value can be used as the trigger for aborting the process, i.e. no further laser processing at this point of the leather is carried out.

In a preferred variant, the intensity of the radiation of the second laser beam detected by the at least one observation unit can be used to control the first laser or the first laser and the second laser.

As part of the method according to the invention, a pulsed UV-laser is preferably used as the first laser (processing laser), wherein a solid body laser with a wavelength of 355 nm or an excimer laser with a wavelength of 351 nm, 308 nm or 248 nm is particularly preferred. The pulse times should preferably be under 200 ns. The beam diameter is 5 to 50 micrometre and preferably about 20 micrometre.

A laser with a wavelength between 380 nm and 3000 nm, i.e. in the VIS/IR range, can be used as the second laser (measuring laser). The wavelength of the second laser is preferably between 400 nm and 800 nm or between 1000 nm and 2200 nm, in particular 532 nm, 1064 nm or between 1900 nm and 2100 nm. With a wavelength of 532 nm or 1064 nm, an yttrium-aluminium-garnet laser can be used. With a wavelength of from 1900 nm to 2100 nm, thulium or holmium lasers can be used.

The beam diameter is 5 to 50 micrometre and preferably about 20 micrometre.

The intensity of the second laser should be chosen in such a way that the radiation of the second laser beam, on one hand, transmits through the covering material as well as possible, on the other hand, the covering material is not damaged or changed at the point of incidence as a result of the second laser beam.

In a further embodiment, a pulsed laser beam can be used as the second laser beam. Here, the pulses of the second laser, the measuring laser, can hit the covering material simultaneously or preferably temporally offset to the pulses of the first laser, the processing laser.

The temporal offset and thus the phase shifting of the pulse trains of the first and second laser can vary and be between 30 nm and 10 microseconds, for example. In one variant, the pulse of the second laser beam hits the covering material about one microsecond before the pulse of the first laser beam. In doing so, 50 kHz lasers, corresponding to a time period of 20 microseconds between two pulses, can be used.

Thus the pulsed first and second lasers can be operated in a phase shifted manner. As a result, the accuracy of the measuring is increased since the secondary effects caused by the subsequent UV-laser pulse necessary for the material removal (for example particle shielding, plasma radiation, luminescence) are decoupled.

In a further variant, the pulse of the first laser beam hits the covering material before the pulse of the second laser beam.

The covering material, the observation unit and the two lasers are preferably stationary during the movement of the laser beams along the track. This makes it possible for the method to be able to be used for highly dynamic laser processes, since only the laser beams have to be deflected.

Leather, artificial leather or planar material is used as the covering material. In general, the diameter of a hole introduced into the covering material using the laser is preferably 5 to 50 micrometre and particularly preferably 10 to 20 micrometre with a hole spacing of from 25 to 100 micrometre, preferably 35 to 60 micrometre. The holes are on a line which can run straight, but also be wavy, zig-zagged or a different shape.

The airbag covers produced by the method according to the invention are characterised in that the bag holes are not visible and cannot be felt, and the airbag cover, which is preferably made of leather, nevertheless rips in the event of a defined force. In addition, there is also a process-reliable reproducibility.

Figure 2:
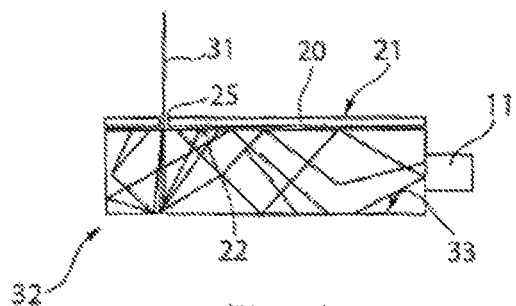
Figure 3:
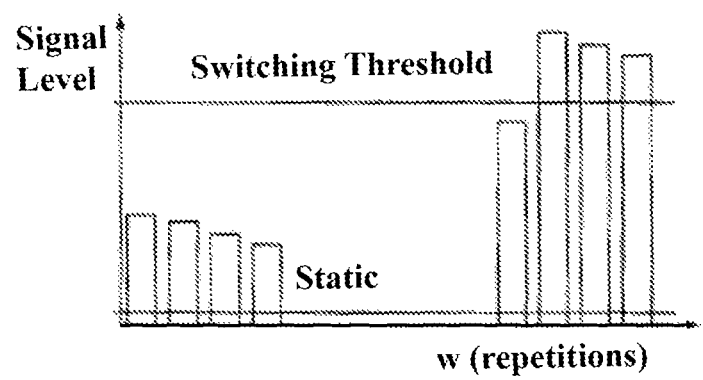

The invention and advantageous embodiments and developments thereof are described and explained in more detail below by means of the examples depicted in the drawings. The features that can be seen in the description and the drawings can be applied individually or in several random combinations according to the invention. Here are shown:

FIG. 1, a schematic depiction of the method according to the invention and the construction, FIG. 2, the schematic radiation course in the hollow chamber and FIG. 3, a schematic depiction of the signal level in the observation unit depending on the number of repetitions.

In FIG. 1, a first laser 30, a second laser 60, an observation unit 11, a scanning device 12 and a piece of leather 20 are schematically depicted. The rear side 21 of the piece of leather 20 points upwards in FIG. 1. A hollow chamber 32 is below the visible side 22 of the piece of leather 20, the inner surface 33 of the hollow chamber being coated with a reflective material. A photodiode is provided in a side wall 36 of the hollow chamber 32 as the observation unit 11.

The focussed pulsed laser beam 31 emitted by the first laser 30, whose beam path is also labelled with 31, is reflected on a first mirror 40 and a second mirror 41 and reaches the scanning device 12, which serves to move the laser beam 31 along a certain path 50 across the piece of leather 20, as is symbolically depicted by arrow P in FIG. 1.

A second laser beam 61 from the second laser 60 is reflected on a semi-transparent mirror 42 into the beam path 31, such that a coupled laser beam 31/61 emerges.

Since the laser radiation of the first laser 30 is pulsed and the laser beam 31 is moved across the piece of leather 20 along the track 50, the laser beam 31/61 is firstly moved to the point M=1 corresponding to the beam 31$a$/61$a$, then to the point M=2 corresponding to the beam 31$b$/61$b$ and so on.

During processing, at each point M, a removal point-by-point emerges as a result of the pulsed first laser beam 31. If the movement duration is now carried out with a high number of repetitions W, then a hole 25 emerges again and again at each point M of the punctiform removal. This is a bag hole 25 with a remaining wall or, if the removal process is not locally stopped at this removal point, a continuous hole.

In the region of the leather 20 in FIG. 1, various points M=1, 2, . . . are marked on the leather. If the first laser beam 31 is at a point M, then the second laser beam 61 also hits this point.

The passage of the radiation of the second laser beam 61 through the bag hole 25 takes place as soon as the thickness of the remaining wall in the hole 25 is thin enough. The transmitted light of the second laser beam 61 now reaches the hollow chamber 32 and falls on its inner surface 33, i.e. the light of the second laser, which enters through the remaining wall and emerges on the visible side, is reflected there and reaches the hollow chamber 32 in a sequence on the observation unit, namely the photodiode 11, as is schematically depicted in FIG. 2.

Of course the transmitted light can also fall directly onto a photodiode 11 or similar.

It can also be seen in FIG. 2 that the transmitted light of the second laser beam 61 hitting the reflecting inner surface 33 reaches the photodiode 11 as a result of a plurality of reflections and scatterings, to a certain extent.

In FIG. 3, the signal level of the radiation of the second laser detected by the observation unit 11 is schematically depicted depending on the number of repetitions W. After the thickness of the remaining wall in the hole 25 is firstly still too great and no radiation can transmit, only static is detected to start with. After a plurality of repetitions W, the signal level suddenly increases, and the switching threshold is exceeded. Exceeding the switching threshold is registered by the observation unit 11 and, in the following drilling process for this bag hole 25, ends.

The determination of the signal level takes place during the laser processing for each bag hole 25 to be generated, such that the laser 30 is only switched in the event of a further processing of the movement algorithm at the points of the holes 25 that are not sufficiently deep. The laser process can also be completely terminated with a certain number of drilled holes 25.

Since the second laser beam 61 does not have any damaging effect on the covering material, the second laser 60 can be permanently switched on or can be switched off for the corresponding holes 25 together with the first laser 30.

In a preferred variant, the intensity of the radiation of the second laser beam 61 detected by the at least one observation unit 11 can be used to control 55 the first laser 30 or the first laser 30 and the second laser 60.

We claim:

1. A method for introducing a defined weakness line by material removal on a covering material for producing a cover for airbags, wherein the covering material has a visible side and a rear side opposite the visible side, and a pulsed first laser beam is guided from a first laser towards the rear side of the covering material and along a track, and at least one observation unit is provided below the visible side of the covering material for monitoring the weakening process, characterised in that a second laser beam from a second laser is coupled into the beam path of the first laser beam, wherein the first pulsed laser beam serves to generate the weakness line, and the second laser beam, emerging on the visible side, is detected by the at least one observation unit.

2. The method according to claim 1, characterised in that the second laser beam is a longer wavelength than the first laser beam.

3. The method according to claim 1, characterised in that the second laser beam is pulsed.

4. The method according to claim 1, characterised in that the pulsed first laser beam from the first laser falls across a mirror and a scanning device onto the rear side of the covering material.

5. The method according to claim 1, characterised in that the second laser beam from the second laser is coupled into a beam path of the pulsed first laser beam across a semi-transparent mirror.

6. The method according to claim 1, characterised in that an intensity of the radiation of the second laser beam detected by the at least one observation unit is used to control the first laser.

7. The method according method according to claim 1, characterised in that the first laser is a UV laser.

8. The method according method according to claim 1, characterised in that the first laser is a solid body laser having a wavelength of 355 nm or an excimer laser having a wavelength of 351 mm or 308 nm or 248 nm.

9. The method according method according to claim 1, characterised in that the wavelength of the second laser is between 380 nm and 3000 nm or between 1000 nm and 2200 nm.

10. The method according method according to claim 1, characterised in that the wavelength of the second laser is between 400 nm and 800 nm, in particular 532 nm, or between 1900 nm and 2100 nm.

11. The method according method according to claim 3, characterised in that the first laser and second laser are operated in a phase-shifted manner.

12. The method according method according to claim 1, characterised in that the covering material, the at least one observation unit and the first laser and the second laser are fixed during the movement of the pulsed first laser beam and the second laser beam along the track.

13. The method according method according to claim 1, characterised in that the first laser is switched off as soon as the at least one observation unit detects the exceeding of a threshold value of the radiation of the second laser beam measured in the at least one observation unit.

14. The method according method according to claim 1, characterised in that a hollow chamber is provided below the visible layer of the covering material, said hollow chamber having a scattering and/or reflecting inner surface.

15. The method according to claim 14, characterised in that the at least one observation unit is provided on the hollow chamber.

16. The method according to claim 1, characterised in that the wavelength of the second laser is 532 nm.

17. The method according to claim 3, characterised in that the pulsed first laser beam from the first laser falls across a mirror and a scanning device onto the rear side of the covering material.

18. Method according to claim 3, characterised in that the second laser beam from the second laser is coupled into the beam path of the first laser beam across a semi-transparent mirror.

19. Method according to claim 3, characterised in that the intensity of the radiation of the second laser beam detected by the at least one observation unit is used to control the first laser.

20. Method according to claim 3, characterised in that the first laser is a UV laser.

* * * * *